United States Patent [19]

Takahashi

[11] Patent Number: 5,402,174
[45] Date of Patent: Mar. 28, 1995

[54] CAMERA APPARATUS HAVING FOCUS DETECTING SENSITIVITY BASED ON ABSOLUTE FOCAL LENGTH

[75] Inventor: Koji Takahashi, Kanagawa, Japan

[73] Assignee: Canon Kabushiki Kaisha, Tokyo, Japan

[21] Appl. No.: 51,603

[22] Filed: Apr. 23, 1993

Related U.S. Application Data

[63] Continuation of Ser. No. 912,568, Jul. 13, 1992, abandoned, which is a continuation of Ser. No. 632,057, Dec. 21, 1990, abandoned, which is a continuation of Ser. No. 406,708, Sep. 13, 1989, abandoned.

[30] Foreign Application Priority Data

Sep. 18, 1988 [JP] Japan ................... 63-233174

[51] Int. Cl.[6] ................... H04N 5/232; H04N 5/225
[52] U.S. Cl. ................... 348/347; 348/345; 348/351; 354/402; 354/195.12
[58] Field of Search ................... 358/227, 225, 55, 906, 358/909, 209, 909.1; 354/400, 403, 402, 406–408, 195.12, 289.1, 289.12; 359/721; H04N 5/232, 5/225; 348/358, 347, 345, 348, 349, 350, 351, 354, 356, 357, 363, 362, 335, 207, 224

[56] References Cited

U.S. PATENT DOCUMENTS

| | | | |
|---|---|---|---|
| 4,404,595 | 9/1983 | Ushiro et al. | 358/227 |
| 4,851,897 | 7/1989 | Inuma et al. | 358/29 |
| 4,857,951 | 8/1989 | Nakajima et al. | 354/400 |
| 4,924,317 | 5/1990 | Hirao et al. | 358/227 |
| 4,967,281 | 10/1990 | Takada | 358/229 |

*Primary Examiner*—James J. Groody
*Assistant Examiner*—Safet Metjahic
*Attorney, Agent, or Firm*—Robin, Blecker, Daley & Driscoll

[57] ABSTRACT

In a camera system including a camera unit and a lens unit which is detachably mounted on the camera unit, an automatic focusing apparatus comprises a focus signal forming circuit which forms a focus detection signal for indicating a focusing state of the lens unit, a focal length information outputting circuit which produces absolute focal length information on the absolute focal length of the lens unit, a transmission circuit which transmits the absolute focal length information to the camera unit, and a control circuit which controls the focus signal forming circuit on the basis of the absolute focal length information.

27 Claims, 7 Drawing Sheets

CAMERA APPARATUS HAVING FOCUS DETECTING SENSITIVITY BASED ON ABSOLUTE FOCAL LENGTH

This is a continuation of prior application Ser. No. 912,568, filed Jul. 13, 1992, (now abandoned), which is a continuation of Ser. No. 632,057, filed Dec. 21, 1990, (now abandoned), which is a continuation of Ser. No. 406,708, filed Sep. 13, 1989, (now abandoned).

BACKGROUND OF THE INVENTION

1. Field of the Invention

This invention relates to an automatic focusing apparatus of camera and more particularly to an apparatus highly suitable for a camera arranged to perform communication of data for control of varied kinds between a camera unit and a lens unit which is detachably mounted on the camera unit.

2. Description of the Related Art

The advancement of video apparatuses such as the video tape recorder (hereinafter referred to as VTR) achieved during recent years has been conspicuous. As a result, the camera-incorporating type VTR or the like has come to include an automatic focusing apparatus as a standard component.

In the case of the camera-incorporating type VTR, particularly in the case where the camera has a zoom mechanism or the like, the characteristic of the automatic focusing apparatus varies with the focal length of the lens. It is therefore necessary to detect focal length information on the side of the lens and to control the characteristic of the focusing apparatus accordingly. The information on the focal length to be used on the camera side in the camera-incorporating type VTR is generally obtained by dividing the focal length range from a wide-angle side through a telephoto side thereof into a number of areas best suited for the lens. Information on the applicable area is detected by an area encoder and is supplied to focus control means.

The following describes, by way of example, a case where the focal length information obtained in the above-stated manner is used by an automatic focusing apparatus or circuit (hereinafter referred to as TV-AF) which detects a focusing state through a TV signal.

Figure 1:
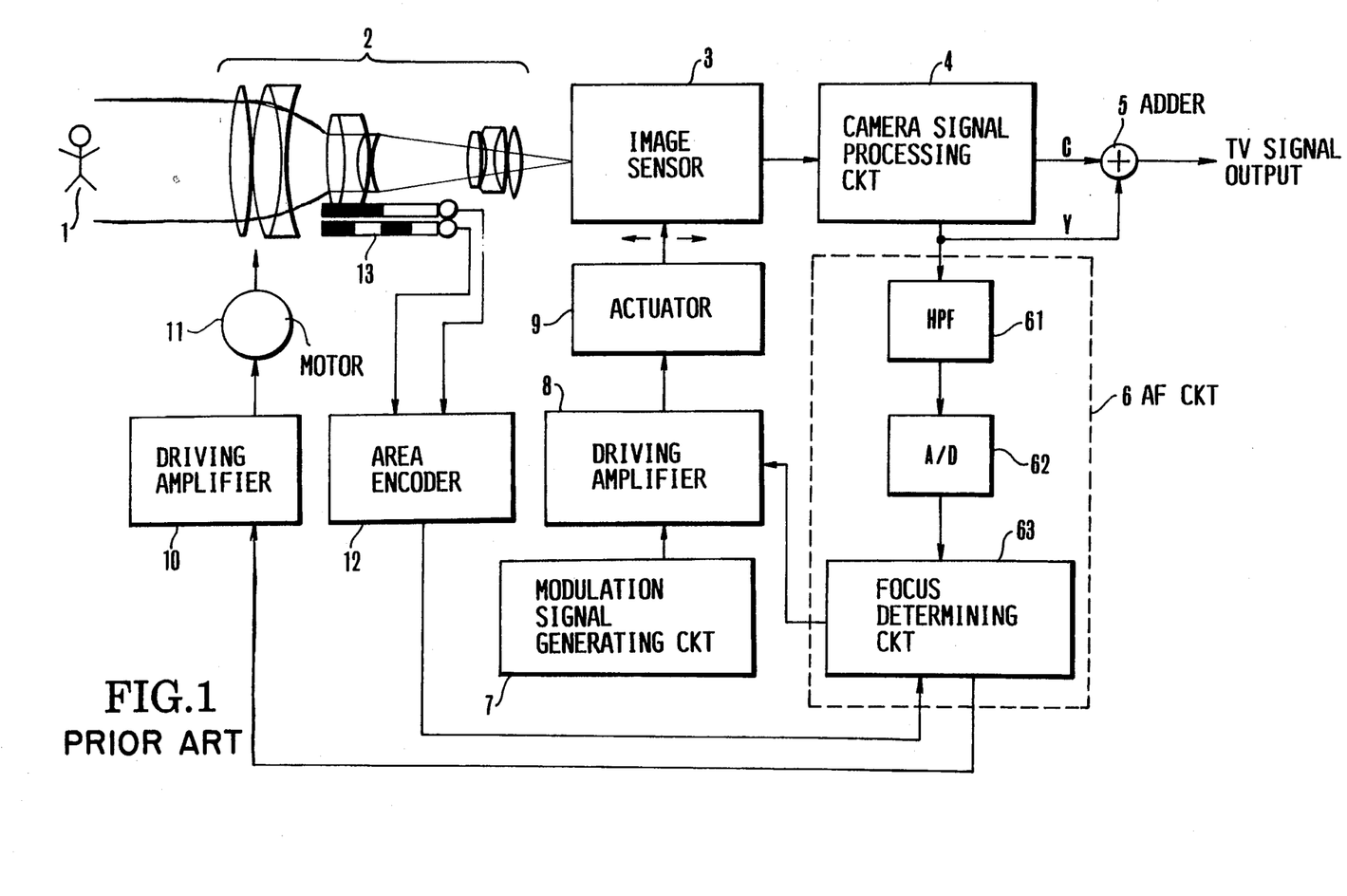
FIG. 1 is a block diagram showing by way of example the conventional VTR.

FIG. 1 is a block diagram mainly showing automatic focusing means included in a camera-incorporating type VTR. Referring to FIG. 1, light from an object 1 to be photographed is imaged on the image sensing plane of an image sensor 3 by a lens unit 2. The image sensor 3 then photo-electrically converts the image into a sensed image signal. The sensed image signal is supplied to a camera signal processing circuit 4. The circuit 4 generates a TV signal. A chrominance signal and a luminance signal are combined together by an adder 5 and produced as a TV signal.

Meanwhile, a luminance signal component output from the camera signal processing circuit 4 is supplied to the automatic focus control circuit 6. Then, within the circuit 6, a high-pass filter (HPF) 61 extracts only a high-frequency component, i.e., a high-fineness signal, which tends to be generated in a greater amount when the lens is in focus. The output of the HPF 61 is supplied to an analog-to-digital (A/D) converter 62 to be converted into a digital signal. The digital signal is then supplied as focus determining information to a focus determining circuit 63. Further, to determine whether the lens position deviates from an in-focus position in the defocus direction, that is, to make a discrimination between near-focus and far-focus positions in the event of defocus, an actuator 9 which is a bimorph plate or the like is driven via a driving amplifier 8 by a signal which is generated by a modulation signal generating circuit 7 at a frame frequency (or a frequency which is several times as high as the frame frequency or a frequency obtained by dividing it into several parts). This causes the image sensor 3 to vibrate at a minute amplitude forward and backward from an image plane. The focus determining circuit 63 then makes a discrimination between near-focus and far-focus states according to a focus modulation signal which has been modulated by the vibration. The result of determination made by the circuit 63 is supplied to a driving amplifier 10. The driving amplifier 10 then causes a motor 11 to shift the position of the lens 2 to an in-focus position. The minute amplitude by the lens actuator 9 to be made in obtaining the focus modulation signal for detecting the direction of defocus is arranged to vary according to the focal length of the above-stated lens optical system.

In other words, the sensitivity of the optical system varies with the focal length. The degree of defocus does not change much with the focus signal modulated to a small degree if the sensitivity is low. If the sensitivity is high, the focus signal, i.e., the degree of defocus, varies to a great degree in response to a slight degree of displacement of the optical system. Therefore, in order to accurately detect the degree of defocus by detecting the near- or far-focus state and the degree of defocus according to the focus modulation signal obtained by slightly vibrating the image sensor in the direction of an optical axis, the amplitude of focus modulation must be changed according to the focal length. In other words, if a lens position is on the telephoto side, the sensitivity is high and permits a smaller modulation amplitude than in the case of a lens position on the wide-angle side.

The apparatus thus is provided with an area encoder 12 and an area encoder pattern 13 for the above-stated process to be carried out according to the focal length of a zoom lens. The area encoder 12 detects the area encoder pattern 13 to find in which of the divided areas of the variable focal length range the lens position is currently located. A detection value thus obtained is supplied to the automatic focus control (AF) circuit 6. The amplification degree of the driving amplifier 8 is controlled to change stepwise the vibration amplitude of the image sensor 3 from one value over to another for each divided area according to the value supplied.

The above-stated area dividing method adopted for the area encoder 12 and the area encoder pattern 13 is called a floating method. In accordance with the floating method, the areas for controlling the focus modulation amplitude are set stepwise by dividing a range from the telephoto end position or the wide-angle end position of each individual lens either by a given distance or in a given ratio irrespectively of the focal length of the lens obtained at the telephoto end or the wide-angle end of the lens in use.

The above is one example of the conventional camera-incorporating type VTR. As mentioned above, there arises no problem in particular in controlling the characteristic of the automatic focusing apparatus in accordance with the focal length of the lens.

However, the recent advancement of the image sensing apparatuses including VTRs and others has come to prompt an attempt to arrange the video camera and the camera-incorporating type VTR to permit use of an interchangeable lens.

With an interchangeable lens system applied to the VTR or the like, the relation of area setting to the focal length of one lens differs from that of another. Therefore, it is impossible to arrange the control circuit of the camera to ensure sufficient lens information interchangeability among different lenses. The above-stated attempt, therefore, would present a serious problem in terms of automatic focus adjustment.

SUMMARY OF THE INVENTION

This invention is directed to the solution of the above-stated problem. It is therefore a first object of the invention to provide an automatic focusing apparatus of camera in an interchangeable lens system capable of interchanging one lens unit with another, in which a control on the side of the camera body can be performed commonly for different lens units irrespective of their kinds.

It is a second object of the invention to provide an automatic focusing apparatus for a camera wherein accurate information on the absolute focal length of a lens unit can be obtained on the side of a camera body, irrespective of the kind of the lens unit, and a lens driving system can be accurately controlled on the basis of the information thus obtained.

It is a third object of the invention to provide a highly reliable automatic focusing apparatus for a camera best suited for an interchangeable lens system, whereby any change in the characteristic of the focusing apparatus can be compensated for by detecting, from a lens, information on the absolute focal length thereof without any change in the performance of the apparatus irrespective of the kind of the lens to be used.

To attain this object, an automatic focusing apparatus which has a camera unit and a lens unit detachably mounted on the camera unit and arranged as a preferred embodiment of the invention comprises focus signal forming means for forming a focus detection signal indicative of a focusing state of the lens unit; focal length information outputting means for outputting absolute focal length information on an absolute focal length of the lens unit; transmission means for transmitting the absolute focal length information to the camera unit; and control means for controlling the focus signal forming means on the basis of the absolute focal length information.

It is a fourth object of the invention to provide a camera system which is capable of obtaining absolute focal length information on each of lens units to be used irrespective of the kind of the lens unit.

It is a fifth object of the invention to provide a camera system which obtains information on an absolute focal length corresponding to each of divided areas of a focal length range fixedly set for each of different lenses, irrespective of the kind of the lens unit and is capable of obtaining a representative focal length which can be used in common as reference for any lens combination with a camera body, so that focus adjustment always can be carried out in an optimum manner.

To attain that object, a camera system having a camera body and a lens unit detachably mounted on the camera body and arranged as a preferred embodiment of this invention comprises output means for outputting a representative value of absolute focal length of each of a plurality of divided areas set by dividing a variable range of focal length of the lens unit; focus adjusting means for adjusting a focusing state of the lens unit; and control means for controlling an operation of the focus adjusting means on the basis of an output of the output means.

Further to attain each of the objects mentioned above, a lens unit arranged as a preferred embodiment of the invention to be detachably mounted on a camera body and to operate under the control of communication from the camera body comprises communication means arranged to divide a variable range of focal length of the lens unit into a plurality of areas and to send information on an absolute focal length obtained at each of the divided areas to the camera body.

The above and other object and features of the invention will become apparent from the following detailed description of embodiments thereof taken in connection with the accompanying drawings.

Figure 2:
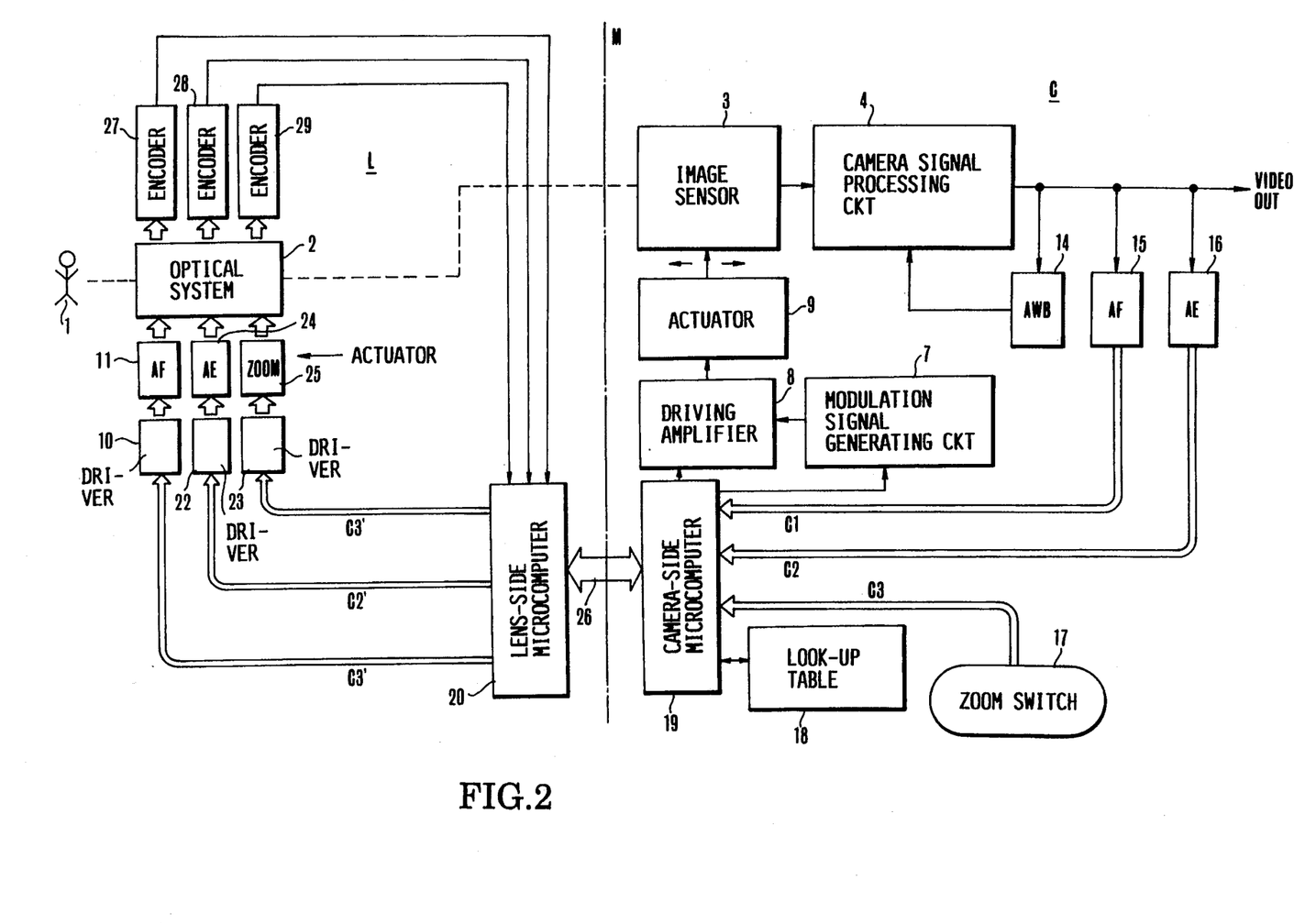
FIG. 2 is a block diagram showing the whole of an embodiment of this invention.

DETAILED DESCRIPTION OF THE PREFERRED EMBODIMENTS:

The details of a camera having the automatic focusing apparatus according to this invention are as described below with reference to the accompanying drawings:

FIG. 2 is a block diagram showing an embodiment of this invention in which the automatic focusing apparatus according to this invention is applied to a video camera which has an interchangeable lens system.

In the case of this embodiment, the invention is applied to a camera-incorporating type VTR which has the TV-AF function on the side of the camera. Further, in FIG. 2, the same component parts as those of the conventional VTR shown in FIG. 1 are indicated by the same reference numerals and the details of them are omitted from the description. FIG. 2 shows a camera unit C on the right-hand side of a mount part M which is indicated by a one-dot chain line. A lens unit L is shown on the left-hand side of FIG. 2.

The image of an object to be photographed is formed on the image sensing plane of an image sensor 3 by means of a optical lens system 2. The image is photoelectrically converted by and produced as a sensed image signal from the image sensor 3. The sensed image signal is converted into a TV signal by a camera signal processing circuit 4. The TV signal thus obtained is supplied to various automatic adjustment circuits, for adjusting actions of varied kinds, including an automatic white balance adjustment circuit (hereinafter referred to as AWB circuit) 14; an automatic focusing circuit (hereinafter referred to as AF circuit) 15; and an automatic exposure control circuit (hereinafter referred to an AE circuit) 16.

These automatic adjustment circuits including the AWB circuit 14, the AF circuit 15 and the AE circuit 16 produce various control signals, which are supplied to applicable parts. The AWB circuit 14 which adjusts a color balance in processing the camera signal produces a control signal and supplies it to the camera signal processing circuit 4. The AF and AE circuits 15 and 16 produce control signals C1 and C2, which are supplied to a microcomputer 19 which is disposed on the side of the camera unit. These control signal C1 and C2 are then supplied via a data communication line 26 to the lens unit L. Further, a zoom switch 17 which is provided for controlling a zoom lens in setting the focal length of the optical system produces a control signal C3. The control signal C3 is supplied also to the microcomputer 19 of the camera unit.

These control signals are sent as communication data via the data communication line 26 from the camera unit C to the lens unit L. The data communication line 26 is connected to a microcomputer 20 which is disposed on the side of the lens unit L. The communication data are all first received by the microcomputer 20.

After arrival at the microcomputer 20 of the lens unit, these control signals C1, C2 and C3 are converted into control degree values C1', C2' and C3' suited for applicable control objects respectively. The control degree values C1', C2' and C3' are respectively supplied to an AF driver circuit 10, an AE driver circuit 22 and a zoom diver circuit 23 for controlling the optical system.

A look-up table 18 for data conversion is arranged to store converting data beforehand for the purpose of facilitating data conversion in obtaining a focus modulation amplitude on the basis of the information on the focal length obtained from the lens unit. The manner in which it is to be used will be described later.

Figure 3:
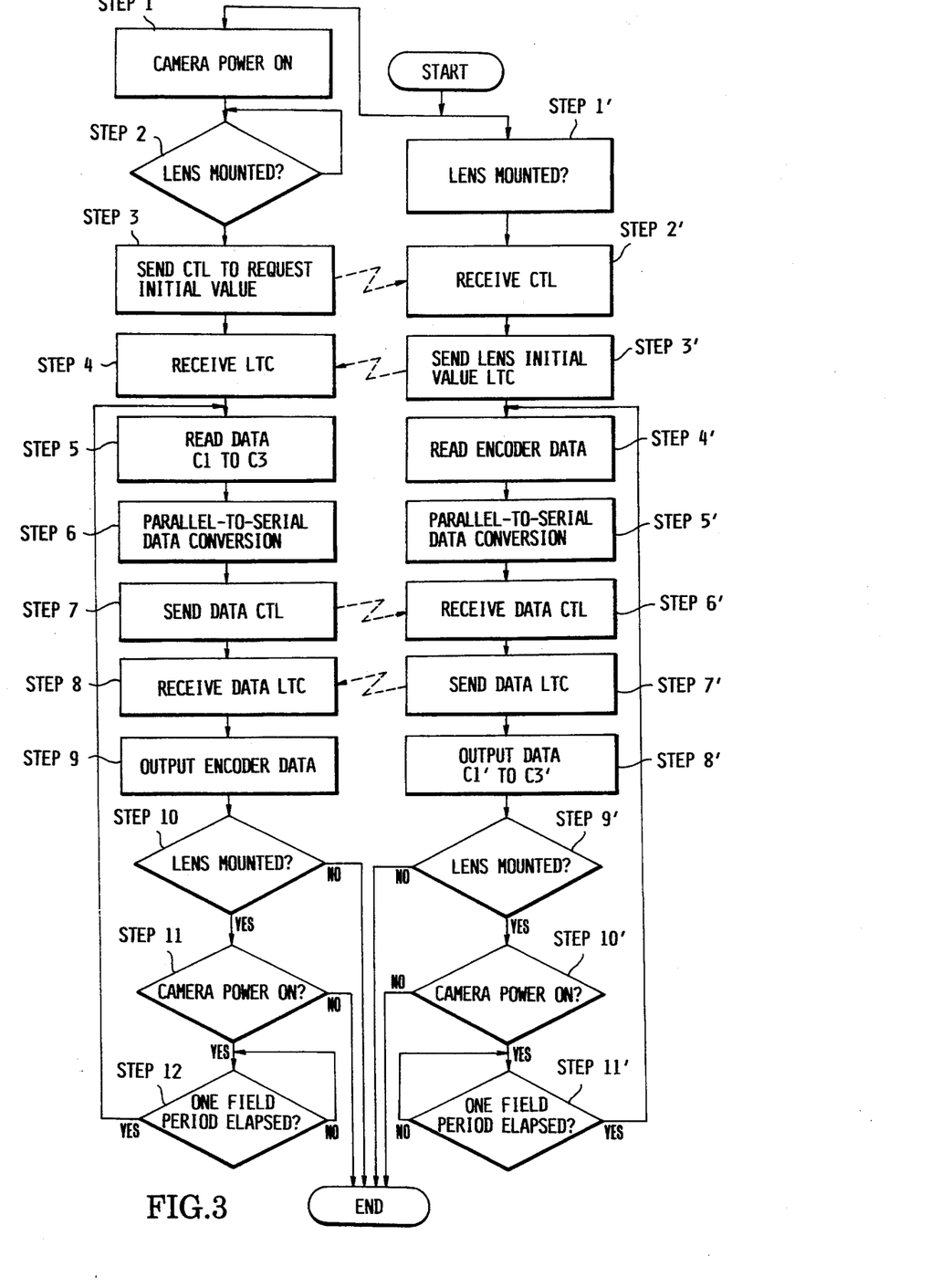
FIG. 3 is a flow chart showing the operation of the embodiment shown in FIG. 2.

The flow of operation of the automatic focusing apparatus in the interchangeable lens system of FIG. 2 is as described below with reference to FIG. 3:

Referring to FIG. 3, power is switched on for the camera unit at a step 1. At a step 2: The microcomputer 19 confirms that the lens is mounted. At a step 3: A request for transmission of initial data about the lens is sent out through the data communication line 26. At a step 4: Initial data of varied kinds including the kind of the lens, etc., is received from the lens unit. At a step 5: The data C1 to C3 mentioned in the foregoing are read by the microcomputer 19 of the camera unit. At a step 6: The data is parallel-to-serial converted into data CTL. At a step 7: The data CTL is sent to the lens unit. At a step 8: Data LTC of varied kinds including detection data of the encoders of the lens unit is received. At a step 9: Varied kinds of control are performed while the encoder data is output. At steps 10 to 12: If the lens is found to be mounted, a check is made to see if the power is on. If the power is found to have been turned on, the flow of operation waits for the lapse of the period of one field. After that, the flow comes back to the step for reading the data C1 to C3. This routine comes to an end if the lens is found dismounted or if the power supply to the camera unit is turned off.

Meanwhile, the flow of operation on the side of the lens unit is as follows: at a step 1', the lens unit is mounted on the camera unit. At a step 2': The initial value request CTL is received from the camera unit. At a step 3': The initial value data LTC about the lens is sent to the camera unit. At this time, the initial values are read out from a ROM or the like which is connected to the microcomputer 20 of the lens unit and are parallel-to-serial converted into the data LTC.

At a step 4': The detection information of the encoders 27, 28 and 29 which are arranged to detect the conditions of the lens is read and taken in by the microcomputer 20. At a step 5': The data thus obtained is parallel-to-serial converted. At a step 6': The data CTL is received. At a step 7': The data LTC is sent out. At a step 8': Information of varied kinds including the data C1' to C3' prepared at the steps 4' and 5' is output. Steps 9', 10' and 11': If the power for the camera unit remains on with the lens unit still mounted on the camera unit, the flow waits for the lapse of one field period. After that, the data detected by the encoders is again read and taken in. If the lens unit is dismounted or if the power for the camera unit is turned off, this routine comes to an end.

With the control information of varied kinds exchanged between the camera unit and the lens unit in the above-stated manner, a control is performed on the various component parts accordingly. For example, an AF control signal C1' is supplied to a driver circuit 10. Then, in response to the output of the driver circuit 10, an AF actuator 11 controls the optical system 2 to adjust its position to an in-focus position.

Further, for example, an AE control signal C2' is output to a driver circuit 22. In response to the output of the driver circuit 22, an AE actuator 24 controls the lens optical system 2 to adjust its aperture to an optimum aperture value. For example, a zoom control signal C3' is supplied to a driver circuit 23. Then, in response to the output of the driver circuit 23, a zoom actuator 25 controls the optical system 2 to adjust its position to a focal length position as designated by the zoom control signal C3'.

The optical system 2 is provided with encoders 27, 28 and 29 for the purpose of confirming the operating state of each of the actuators. The encoder 27 is provided for detection of a focus position, the encoder 28 for detection of the aperture position and the encoder 29 for detection of information on a focal length obtained by a zooming operation. Information obtained by these detecting actions is supplied to the microcomputer 20 which is disposed within the lens unit. The information from these encoders is not only used for control actions to be performed on the side of the lens unit but is also sent, when necessary, to the microcomputer 19 of the camera unit to be used for AF and AE processes, etc., to be performed on the side of the camera unit.

In a case where the information from the zoom encoder which is an area encoder relative to the focal length is used for TV-AF, for example, the focal length area dividing operation of the lens unit is as follows:

The image of an object 1 to be photographed is converted into a TV signal and produced through the image sensor 3 and the camera signal processing circuit 4. Meanwhile, to obtain a focus modulation signal which is necessary for the AF process, the image sensor 3 is slightly vibrated in the direction of the optical axis by the modulation signal generating circuit 7, the driving amplifier 8 and the modulating actuator 9. By this, the sensed image signal output from the image sensor 3 is focus-modulated. As a result, the signal output from the camera signal processing circuit 4 is also focus-modulated. Information on the direction and degree of defocus is obtained from the modulation frequency component of the signal output from the circuit 4. In accordance with this information, the AF circuit 15 produces a focus control signal C1.

The control signal C1 is supplied to the microcomputer 19 of the camera unit and is then sent out to the lens unit via the data communication line 26.

The data sent from the camera unit to the lens unit in the above-stated manner is received by the microcomputer 20 of the lens unit. On the side of the lens unit, the microcomputer 20 converts the control signal C1 received from the AF circuit 15 of the camera unit into a given control degree on the basis of data obtained. The control degree thus obtained is sent to the driver circuit 10. The driver circuit 10 then drives the actuator 11 to shift the optical system 2 to its in-focus position. The result of this is detected by the AF encoder 27 and is always confirmed by the microcomputer 20 of the lens unit.

In order to carry out the focus modulation type TV-AF action, information from the zoom lens area encoder 29 is necessary for control over the amplitude of the driving vibrations of the actuator, which is a piezoelectric element or the like and is disposed within the lens unit. Since the sensitivity varies with the focal length, the amplitude must be controlled according to the focal length of the lens as mentioned in the foregoing.

Figure 4:
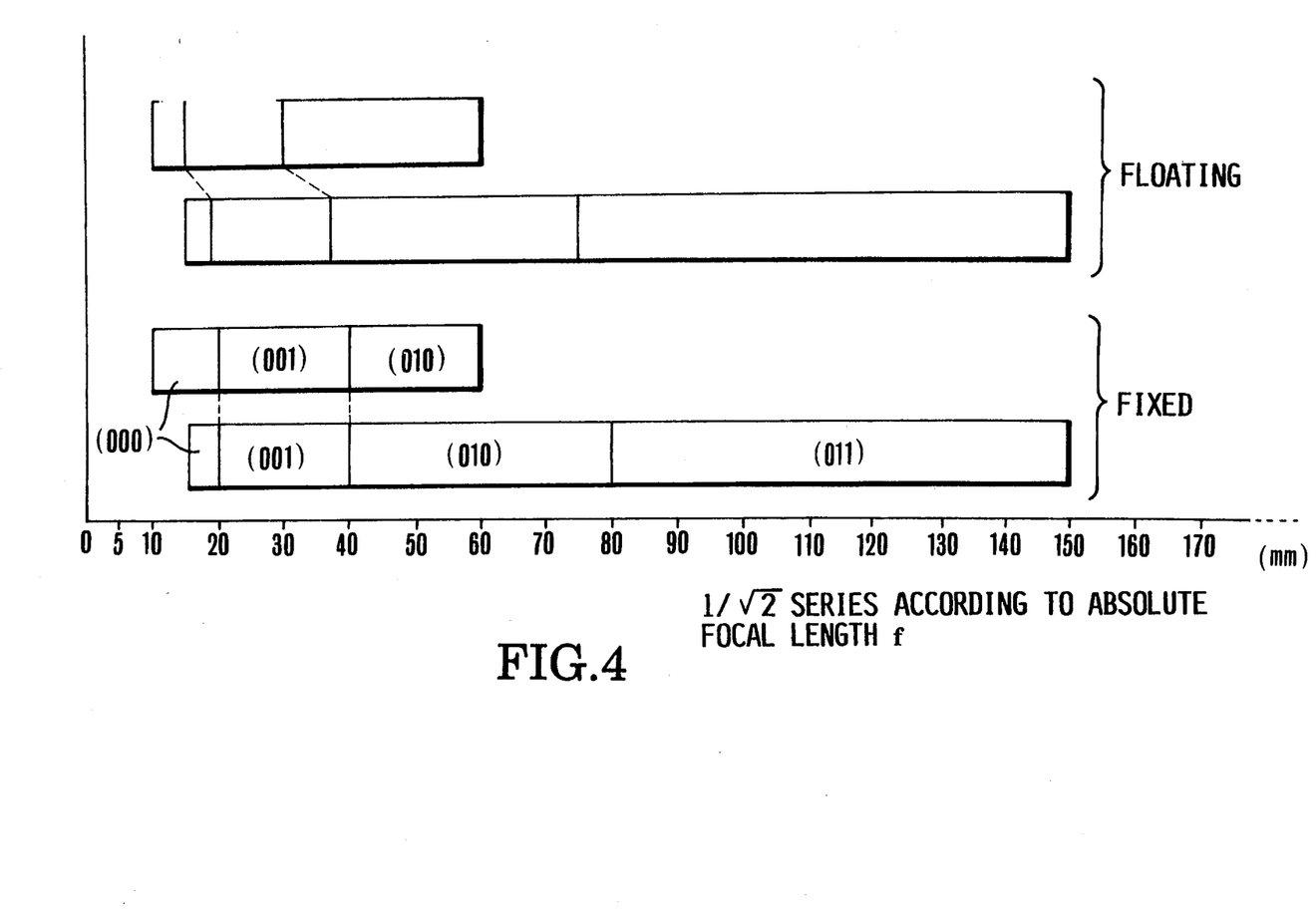
FIG. 4 shows the focal length area dividing method of this invention.

FIG. 4 shows the relation of the vibration amplitude of the actuator to the focal length of the lens obtained by the invented apparatus in comparison with the relation obtained by the conventional floating method. The focal length of the lens is shown on the axis of abscissa. In accordance with the floating method, the focal length areas each of which are determined by a given distance or by a given multiple are allotted either from the wide-angle end or from telephoto end of the lens one after another irrespective of the focal length of the telephoto end or wide-angle end focal length of the lens. Therefore, the focal length is divided in a manner determined for the variable range of the focal length of the lens mounted on the camera body. Although the arrangement of the encoder can be simplified by the floating method, it would give a focal length completely deviating from the real or absolute focal length depending on the telephoto or wide-angle end focal length and the variable range of the focal length of the lens in use. The absolute focal length tends to vary while the position of the encoder remains unchanged. It is, therefore, hardly possible to accurately control the vibration amplitude of the focus modulating actuator, i.e., the focus modulation signal.

Whereas, the encoder of this embodiment detects the absolute focal length of the lens and produces information on nothing else but the absolute focal length of the lens. In addition to that, according to this invention, the focal length dividing areas for stepwise control over the amplitude of the focus modulation signal are set and allocated within a given focal length range.

The divided area is actually set as follows: as shown in FIG. 4, a focal length dividing range is widely set beforehand. Then, this area is divided at intervals of a value which is an integer times as much as a value obtained by raising the square root of 2 to n-th power. For example, the focal length f can be set at a value expressed as: $f = 10 \, (\sqrt{2})^n$. According to the results of tests, the range is preferably set at $-2 \leq n \leq 12$. This range is thus divided at intervals of, for example, the above-stated focal length value f. A representative value indicative of a current area is supplied to the microcomputer 20 of the lens unit. Then, this value is sent via the data communication line 26 to the camera unit at intervals of a given length of time, which is, for example, an integer times as much as a frame frequency. This enables the embodiment to always stably obtain information on the degree and direction of defocus by controlling the amplitude of the focus modulation signal, i.e., the vibration amplitude of the image sensor in an optimum manner.

The focal length data which is obtained in the above-stated manner is transmitted to the microcomputer 19 of the camera unit as follows: for example, addresses 000, 001, 002,—are assigned to the divided areas. Then, the data for the address of an absolute divided area to which the current focal length belongs is sent to the microcomputer 19 of the camera unit.

Figure 5:
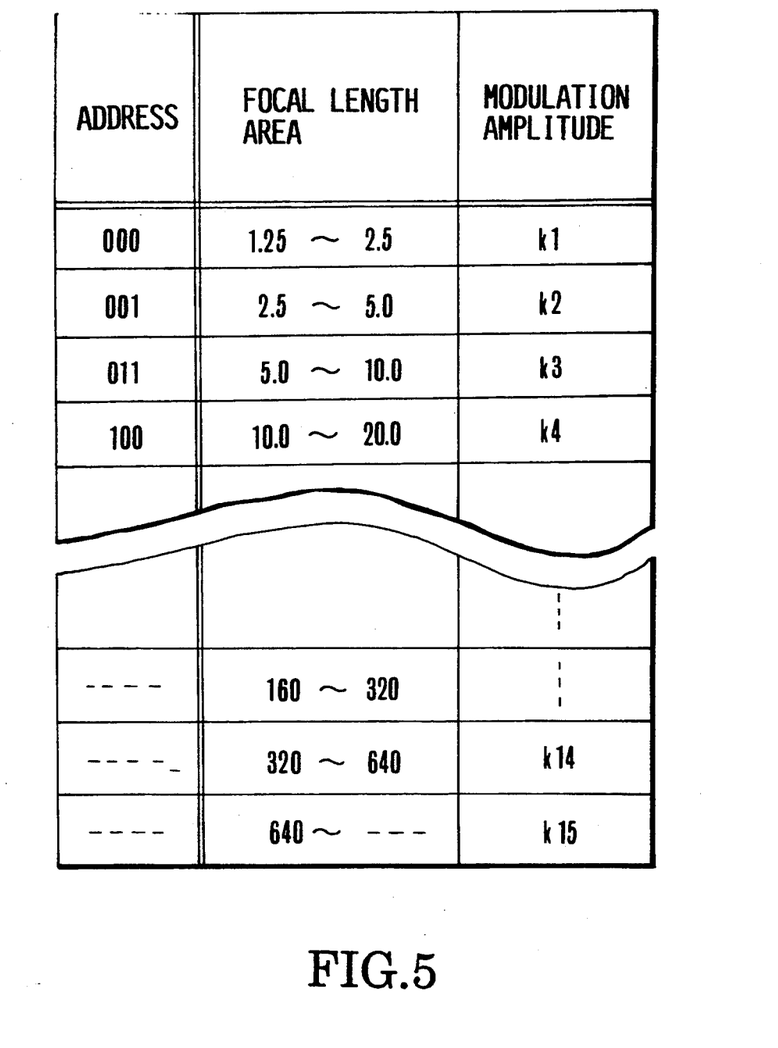
FIG. 5 shows the data arrangement of the same embodiment.

The information on the absolute focal length of the lens is transmitted from the lens unit to the camera unit. The microcomputer 19 of the camera unit converts the information into a control signal for the actuator 9. At that time, information purely about the focal length may be sent to the microcomputer 19 of the camera unit to obtain by computation the focus modulation amplitude on the basis of the information (or data). However, the communication data and computation can be greatly simplified by arranging, on the side of the camera unit, a look-up table 18 to be used for data conversion in obtaining the focus modulation amplitude corresponding to the divided area on the basis of the absolute focal length as shown in FIG. 5. This look-up table 18 is composed of a ROM and is arranged to receive the data for the addresses of the divided areas and to convert it there. This not only alleviates the load imposed on the microcomputer 19 of the camera unit but also quickens the computing speed. The look-up (conversion) table 18 stores the amplitude values of the actuator 9 corresponding to the focal length areas.

With the divided areas of the operable focal length set beforehand as described above, the information on their limited conversion ranges is stored in the above-stated conversion table 18 of the camera unit.

The microcomputer 19 of the camera unit performs a necessary data converting action by reading out the value of the conversion table 18. In the case of the above-stated modulation type TV-AF, the modulation control signal is formed by reading out the amplitude value information relative to the actuator 9, from the conversion table 18. The modulation control signal is supplied from the microcomputer 19 of the camera unit to the driving amplifier 8 for the actuator 9. The vibration amplitude of the actuator 9, i.e., the image sensor 3, is controlled by this signal.

Figure 6:
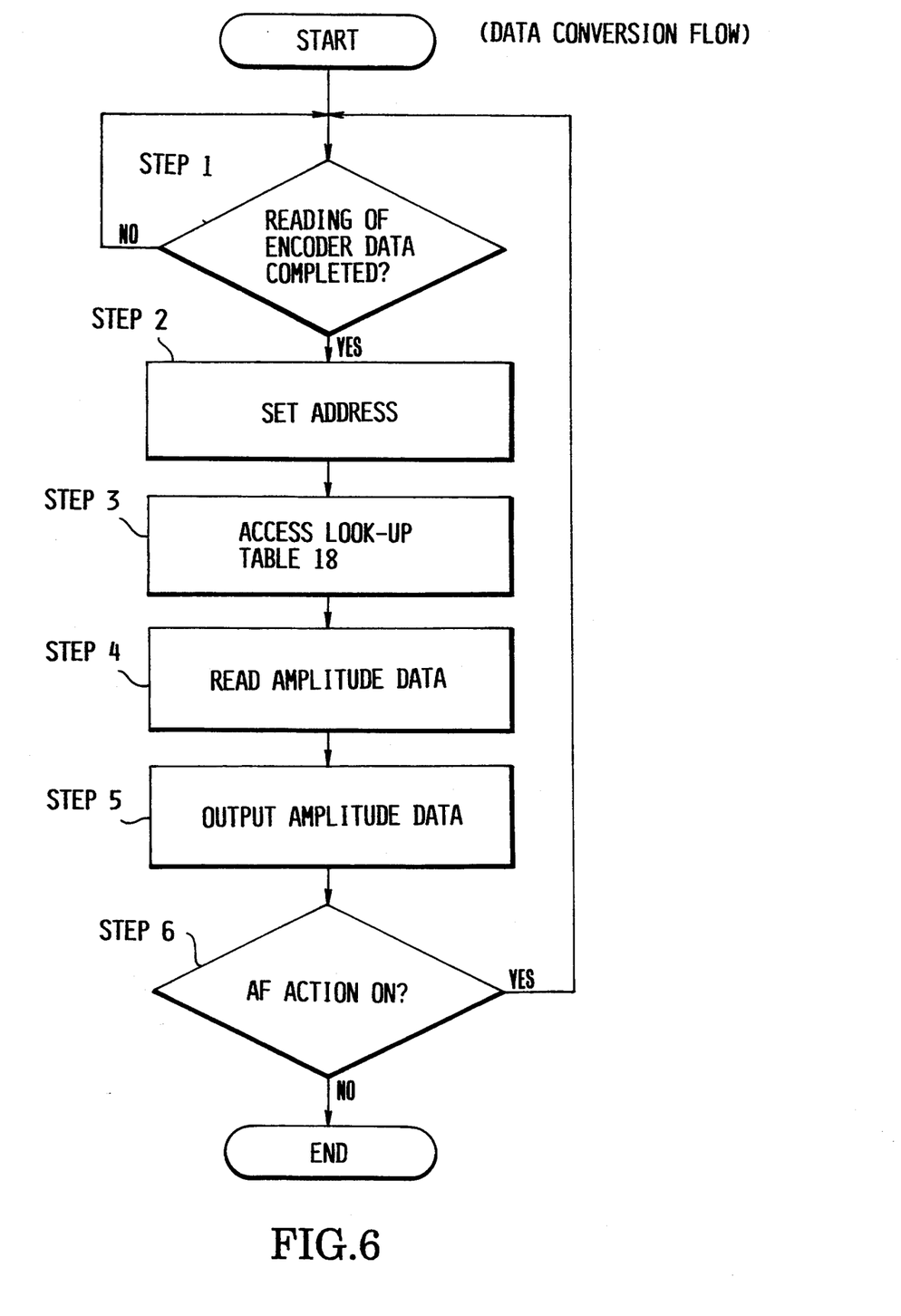
FIG. 6 is a flow chart showing the data converting operation of the invention.

The procedures for the data conversion to be executed by the microcomputer 19 of the camera unit are as shown in a flow chart in FIG. 6. Referring to FIG. 6, the data conversion flow of operation is as follows. At a step 1: The data of varied kinds sent from the microcomputer 20 of the lens unit, including the address data for the areas divided on the basis of the absolute focal length, is read by the microcomputer 19 of the camera unit. At a step 2: Upon completion of reading, the address data is decoded. An address to be accessed is set. At a step 3: The address is checked up on the look-up table 18 according to the data of the address. At a step 4: Corresponding address data is called and is read and taken in by the microcomputer 19 of the camera unit as the amplitude control signal for focus modulation. At a step 5: Information on the degree of control (amplitude data) is supplied to the driving amplifier 8. The flow then comes to a step 6. At the step 6: The above-stated steps are repeated until the AF action comes to an end. By the above-stated operation, the vibration of the image sensor 3 is controlled to be at a value at which the amplitude of the focus modulation signal corresponds to the sensitivity obtained at the current focal length of the lens. In other words, on the wide-angle side where the sensitivity is low, the focus signal is not changeable by a slight degree of the vibration of the image sensor 3. In this instance, therefore, the amplitude of vibrations of the image sensor 3 caused by the actuator 9 is increased in such a way as to obtain a focus modulation signal of a sufficient amplitude for focus determination. On the telephoto side where the sensitivity is high, the focus signal greatly changes in response to even a slight degree of vibrations of the image sensor 3. Therefore, the control is performed to have the actuator 9 vibrate at a smaller amplitude to prevent a signal wave form distortion. This control operation can be carried out by controlling the gain of the driving amplifier 8 which drives the actuator 9.

After the focus modulation signal is obtained in the above-stated manner, the defocus direction is detected from the phase of the focus signal in the same manner as in the case of the conventional camera-incorporating type VTR shown in FIG. 1. Then, an in-focus state is determined on the basis of the peak quantity value of the high frequency component of the sensed image signal. The focus of the lens is adjusted in such a way as to bring the peak value to a maximum value.

As described in detail in the foregoing, the embodiment is capable of compensating for any change of characteristic of the focusing device by detecting the absolute focal length information of the lens unit without necessitating any change on the side of the camera body with any interchangeable lens selected and used in combination with the camera unit. In other words, the arrangement according to this invention gives an automatic focusing device best suited for a highly reliable interchangeable lens system which never has its focus adjusting performance vary with the kind of lens used.

Further, in accordance with the arrangement described, the embodiment divides the focal length of the lens unit into a plurality of areas; an address representing the absolute focal length of each of the divided areas is sent to the camera unit; and necessary control information is obtained from the look-up table 18 provided on the side of the camera unit. However, this arrangement is changed in another embodiment of the invention which is as shown in FIG. 7.

Figure 7:
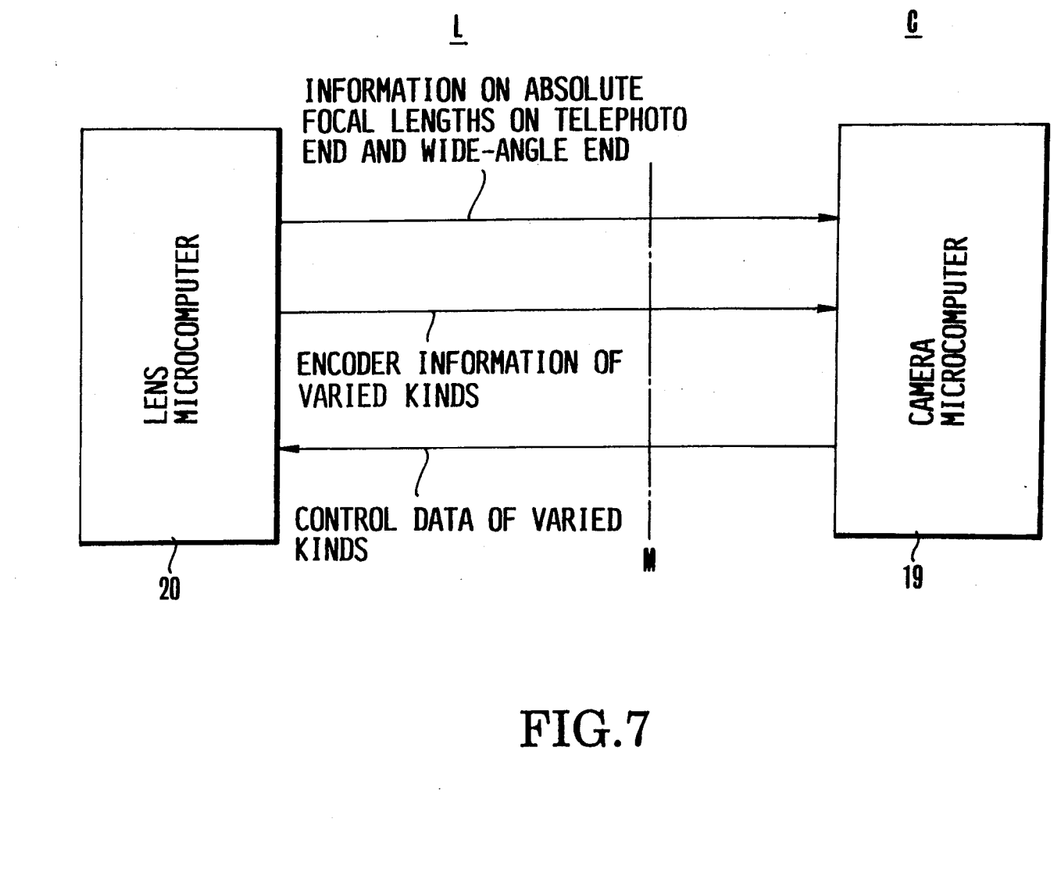
FIG. 7 is a block diagram showing the essential parts of another embodiment of this invention.

Referring to FIG. 7, the embodiment is arranged as follows: information on the absolute focal length obtained at the telephoto and wide-angle end positions of the lens and information of the zoom encoder are sent from the microcomputer 20 of the lens unit to the microcomputer 19 of the camera unit. On the side of the camera unit, an adding operation is performed on the absolute focal length obtained at the telephoto or wide-angle end and the encoder information to obtain thereby information on the absolute focal length for any desired lens position. In other words, the focal length range of the lens can be divided stepwise into a plurality of areas on the side of the camera body. Then, a control operation can be carried out in the same manner as in the foregoing embodiment by generating an address indicative of a representative value of each area and by checking it with reference to the look-up table of FIG. 5.

In accordance with this invention, the focal length values of interchangeable lens are fixedly set beforehand. This enables the embodiment of the invention to adequately operate for any interchangeable lens without requiring any change in the arrangement of the camera unit. In other words, the invention greatly enhances the expansibility of a camera system arrangement to make it capable of accepting a newly designed lens or the like.

What is claimed is:

1. A camera having a camera unit and a lens unit detachably mounted on said camera unit, comprising:
    a) focus signal forming means for forming a focus detection signal by detecting a focusing state;
    b) memory means for storing information corresponding to a plurality of areas defined by dividing a focal length variable range between a tele-end and a wide-end of said lens unit into a plurality of areas on the basis of an absolute focal length information of said lens unit;
    c) focal length information outputting means for outputting said absolute focal length information of said lens unit;
    d) transmission means for transmitting said absolute focal length information to said camera unit in a predetermined period of time; and
    e) control means for controlling said focus signal forming means on the basis of said area information on said absolute focal length information.

2. A camera according to claim 1, wherein said lens unit is a zoom lens.

3. A camera according to claim 2, wherein said focal length information outputting means is arranged to supply a representative value of each of said plurality of areas to said camera unit.

4. A camera according to claim 2, wherein said focal length information outputting means is arranged to transmit information on absolute focal lengths obtained at telephoto and wide-angle end positions of said lens unit and a detection output of an encoder indicative of a focal length of said lens unit to said camera unit.

5. A camera according to claim 3, wherein said camera unit has a memory forming a control data table which stores control information required for controlling said focus signal forming means.

6. A camera according to claim 4, wherein said camera unit has a memory forming a control data table which stores control information required for controlling said focus signal forming means.

7. A camera according to claim 5 or 6, wherein said control information required for controlling said focus signal forming means is selected from said control data table according to information output from said focal length information outputting means and is supplied to said focus signal forming means.

8. A camera according to claim 7, further comprising image sensing means for producing a sensed image signal by photo-electrically converting an image of a photographed object formed by said lens unit, and optical path modulating means for changing, in a given cycle, an optical path length extending to said image sensing means through said lens unit, said focus signal forming means being arranged to detect a focusing state of said lens unit on the basis of a change of said sensed image signal caused by a change in said optical path length.

9. A camera according to claim 8, wherein said optical path modulating means is arranged to vibrate said image sensing means in the direction of an optical axis.

10. A camera according to claim 9, wherein said control means is arranged to control an amplitude of vibration of said image sensing means vibrated by said optical path modulating means.

11. A camera system having a camera unit and a lens unit detachably mounted on said camera unit, comprising:
   a) output means for outputting a representative value of absolute focal length information of each of a plurality of divided areas set by dividing a variable range of focal length of said lens unit on the basis of said absolute focal length, said absolute focal length information being stored in memory means in said lens unit;
   b) focus detecting means for detecting a focusing state of said lens unit;
   c) control means for controlling an operation of said focus detecting means on the basis of an output of said output means; and
   d) transmitting means for transmitting said area information on said absolute focal length information to said camera in a predetermined period of time.

12. A camera system according to claim 11, wherein said camera unit has a memory forming a control data table which stores control information required for controlling said focus detecting means.

13. A camera system according to claim 12, wherein said control information required for controlling said focus detecting means is selected from said control data table according to information output from said output means, and wherein said control information selected is supplied to said focus detecting means.

14. A camera system according to claim 13, further comprising image sensing means for producing a sensed image signal by photo-electrically converting an image of a photographed object formed by said lens unit, and optical path modulating means for changing, in a given cycle, an optical path length extending to said image sensing means through said lens unit, said focus detecting means being arranged to detect the focusing state on the basis of a change of said sensed image signal caused by a change in said optical path length.

15. A camera system according to claim 14, wherein said optical path modulating means vibrates said image sensing means in the direction of an optical axis.

16. A camera system according to claim 15, wherein said control means is arranged to control an amplitude of vibration of said image sensing means vibrated by said optical path modulating means.

17. A camera system having a camera unit and a lens unit detachably mounted on said lens unit, comprising:
   a) focus detecting means for detecting a focusing state of said lens unit to produce a focus control signal for controlling the focusing state of said lens unit;
   b) driving means for controlling the focusing state of said lens unit on the basis of the focus control signal output from said focus detecting means;
   c) output means for outputting a plurality of area information formed by dividing a variable range of a focal length of said lens unit on the basis of an absolute focal length of said lens unit, said area information formed on the basis of said absolute focal length being stored in a memory in said lens unit;
   d) control means for controlling the sensitivity of said focus detecting means in accordance with said area information formed on the basis of said absolute focal length; and
   (e) communication means for communicating the focus control signal output from said focus detecting means and said area information formed on the basis of said absolute focal length between said lens unit and said camera unit, wherein said communication means is arranged to perform, in a predetermined period of time, data communication between microcomputers which are respectively disposed on the sides of said lens unit and said camera unit.

18. A camera system according to claim 17, wherein said camera unit has a memory forming a control data table which stores control information required for controlling said focus detecting means.

19. A camera system according to claim 18, wherein said control information required for controlling said focus detecting means is selected from said control data table in accordance with information output from said output means, and wherein said control information selected is supplied to said focus detecting means.

20. A camera system according to claim 19, further comprising image sensing means for producing a sensed image signal by photo-electrically converting an image of a photographed object formed by said lens unit, and optical path modulating means for changing, in a given cycle, an optical path length extending to said image sensing means through said lens unit, said image detecting means being arranged to detect the focusing state on the basis of a change of said sensed image signal caused by a change in said optical path length.

21. A camera system according to claim 20, wherein said optical path modulating means vibrates said image sensing means in the direction of an optical axis.

22. A camera system according to claim 21, wherein said control means is arranged to control an amplitude of vibration of said image sensing means vibrated by said optical path modulating means.

23. A camera system according to claim 17, wherein said focus detecting means is comprised in said microcomputer disposed on the side of said camera unit.

24. A camera system according to claim 23, wherein said lens unit microcomputer serves as means for controlling said output means and said driving means.

25. A lens unit detachably mounted on a camera body, comprising:
   (a) lens means movably provided for varying a focal length;
   (b) memory means for storing a plurality of regions set by dividing a variable range of focal length of said lens means on the basis of an actual and absolute focal length;
   (c) output means for outputting information of a region corresponding to a position of said lens means read out from said memory means; and
   (d) communication means for communicating said information of the region to said camera body according to an instruction from said camera body.

26. A lens unit according to claim 25, wherein said plurality of regions are divided from said variable range of focal length of said lens means in accordance with the formula $f = 10\,(\sqrt{2})^n$, where f: focal length, n: positive integer.

27. A lens unit according to claim 25, wherein said communication means transmits said information of the region to the camera body in synchronism with the V sync.

* * * * *

UNITED STATES PATENT AND TRADEMARK OFFICE
CERTIFICATE OF CORRECTION

PATENT NO. : 5,402,174
DATED : March 28, 1995
INVENTOR(S) : Koji Takahashi et al.

It is certified that error appears in the above-indentified patent and that said Letters Patent is hereby corrected as shown below:

Col. 5, line 10. Change "signal" to -- signals --.

Col. 5, line 29. Change "diver" to -- driver --.

Signed and Sealed this

Sixth Day of June, 1995

*Attest:*

BRUCE LEHMAN

*Attesting Officer*   *Commissioner of Patents and Trademarks*